(12) United States Patent
Price (10) Patent No.: US 8,095,403 B2
(45) Date of Patent: Jan. 10, 2012

(54) SYSTEM AND METHOD FOR PROVISION OF MAINTENANCE INFORMATION AND PRODUCTS

(75) Inventor: Kevin Price, River Forest, IL (US)

(73) Assignee: KAP Holdings, LLC, Oak Park, IL (US)

( * ) Notice: Subject to any disclaimer, the term of this patent is extended or adjusted under 35 U.S.C. 154(b) by 708 days.

(21) Appl. No.: 12/187,665

(22) Filed: Aug. 7, 2008

(65) Prior Publication Data

US 2009/0043629 A1 Feb. 12, 2009

Related U.S. Application Data

(60) Provisional application No. 60/955,069, filed on Aug. 10, 2007.

(51) Int. Cl.
*G06F 17/50* (2006.01)
(52) U.S. Cl. ............... 705/7; 705/7.12; 705/8; 705/305; 705/29; 707/104.1; 717/78; 709/202
(58) Field of Classification Search .................. 705/8, 7, 705/1, 29, 305; 707/104.1, 10, 8, 102, E17.001; 717/78
See application file for complete search history.

(56) References Cited

U.S. PATENT DOCUMENTS

| | | | |
|---|---|---|---|
| 6,327,594 B1 * | 12/2001 | Van Huben et al. ................... | 1/1 |
| 6,665,966 B1 | 12/2003 | Beck | |
| 6,868,389 B1 | 3/2005 | Wilkins et al. | |
| 7,096,193 B1 | 8/2006 | Beaudoin et al. | |
| 7,139,728 B2 | 11/2006 | Rigole | |
| 7,143,089 B2 | 11/2006 | Petras et al. | |
| 2001/0047290 A1 | 11/2001 | Petras et al. | |
| 2002/0016734 A1 | 2/2002 | McGill et al. | |
| 2002/0035495 A1 * | 3/2002 | Spira et al. ........................ | 705/7 |
| 2002/0097419 A1 | 7/2002 | Chang et al. | |
| 2002/0107716 A1 | 8/2002 | Callahan et al. | |
| 2002/0120502 A1 | 8/2002 | Sakaguchi | |
| 2002/0130784 A1 | 9/2002 | Suzuki et al. | |
| 2002/0143564 A1 * | 10/2002 | Webb et al. ........................ | 705/1 |
| 2002/0143664 A1 | 10/2002 | Webb | |
| 2002/0173885 A1 | 11/2002 | Lowrey et al. | |
| 2003/0005056 A1 | 1/2003 | Yamamoto et al. | |
| 2003/0033269 A1 | 2/2003 | Ebertshauser | |
| 2003/0040957 A1 | 2/2003 | Rodriguez et al. | |

(Continued)

FOREIGN PATENT DOCUMENTS

JP 2003022331 1/2003

(Continued)

*Primary Examiner* — Vanel Frenel
(74) *Attorney, Agent, or Firm* — Fitch, Even, Tabin & Flannery (57) ABSTRACT

A system and method are provided for the comprehensive provision of maintenance related information and products to a client. By one approach, item information is received from a client regarding at least one of a plurality of disparate items. The method also includes receiving manufacturer information regarding the plurality of disparate items from information from manufacturers of the items. A selectively accessible database is created that includes at least in part the item information, the manufacturer information, and maintenance information derived at least in part from the manufacturer information relating to servicing at least one of the disparate items and/or to a product relating to at least one of the disparate items. The client is provided with access to the maintenance information stored on the selectively accessible database. The maintenance information can be accessed from brick and mortar hardware stores as well.

21 Claims, 9 Drawing Sheets

U.S. PATENT DOCUMENTS

| | | |
|---|---|---|
| 2003/0154325 A1 | 8/2003 | Castle |
| 2004/0002798 A1 | 1/2004 | Simons et al. |
| 2005/0050096 A1* | 3/2005 | Gomes et al. .............. 707/104.1 |
| 2006/0085275 A1* | 4/2006 | Stokes et al. .................... 705/26 |
| 2006/0155616 A1* | 7/2006 | Moore et al. .................... 705/30 |
| 2008/0222631 A1* | 9/2008 | Bhatia et al. .................. 717/178 |

FOREIGN PATENT DOCUMENTS

| | | |
|---|---|---|
| WO | 0057259 A2 | 9/2000 |
| WO | 0232099 A1 | 4/2002 |

* cited by examiner

PartScription | Find a Part | Client's Home Inventory | Find a Part | Projects Your Account   Help & Customer Service   Find a Local Hardware Store   🛒 1 item in cart   Logout Hello, Client!   505   510   515

⚠ A credit card in your account is about to expire. Please update your payment method.

⚠ Maytag has issued a product recall of Jenn-Air dishwashers purchased between 1997 and 2001. Read more  520

Maintenance
- ☑ Current Need — Maytag Dryer Belt Inspection — Purchase Parts Now
- ☐ April 2008 — Furnace Filter Replacement — Purchase Parts Now
- ☐ April 2008 — SubZero 550 Filter Replacement — Purchase Parts Now
- ☐ — Furnace Filter Replacement — Purchase Parts Now
- ☐ October 2008 — Furnace Filter Replacement — Purchase Parts Now Check the box to mark an item complete
Full Maintenance Schedule   530

Recent Orders   540
- Order XXXXXX   Aug 8, 2007   Pending
- Order XXXXXX   Aug 6, 2007   Shipped
- Order XXXXXX   July 31, 2007   Delivered
- Order XXXXXX   July 20, 2007   Delivered
- Order XXXXXX   June 16, 2007   Delivered   Track Shipment Full Order History

Favorite Projects   550
- Replace you door gasket
- Repair pump assembly
- Stainless steel cleaning
- Repair pump assembly
- Stainless steel cleaning Full Project List

Find a Part   560
Search: Enter keywords or part number here   Find It!
Browse b| Maytag Epic Front-Load Washer
Select M| Maytag Epic Front-Load Dryer
         | Maytag dishwasher
         | Maytag refrigerator
         | Maytag disposal gasket    Go

Client's Home Inventory   Add Room   570
Home   Add Family Member
- Basement (2 items)
- Family Room (4 items)
- Garage (2 items)
- Client's Office (2 items)
- Kitchen (3 items)
- Laundry (2 items)
- Master Bedroom (1 item)

Personal Items
- Client (3 items)
- Spouse (3 items)

Maintenance Tips for  580  Spring!

KitchenAid Accessories Now Available   1-XXX-XXX-XXXX

© 2007 PartScription  Privacy Policy  Security Policy  Return Policy  About Us  Contact Us  Press  Your Account

| PartScription | Find a Part | Client's Home Inventory | Projects | Your Account | Help & Customer Service | Find a Local Hardware Store | 🛒 1 item in cart |

505 — 510 — 515 — Logout

Hello, Client!
Client's Home Inventory

Current Need: Maytag Portable Dishwasher  7/2007 <u>Clean Filter</u>   605

⚠ Maytag has issued a product recall of Jenn-Air dishwashers purchased between 1997 and 2001.  <u>Read more</u>   610

Add a New Inventory Item   650

How May We Help You More?
Tell us about your <u>oven</u> or another item in your home.

Having Trouble?
Having trouble finding the product you are looking for? <u>Chat with us</u> or give us a call at 1-XXX-XXX-XXXX

| Home | 620 | Add Room |

Basement
<u>Maytag M120 Series Gas Furnace</u>   622
<u>Maytag 1200 Plus Series Water Heater</u>

Kitchen
<u>Maytag Portable Dishwasher</u>   624

Garage
<u>Maytag Freezer On Bottom Refrigerator</u>   626
<u>Maytag Chest Freezer</u>

| Personal Items | Add Family Member |

Client
<u>Apple iPod Nano (4 GB)</u>   632
<u>RIM Blackberry 8800</u>
<u>IBM ThinkPad</u>

Spouse
<u>Apple iPod Nano (4 GB)</u>   634
<u>RIM Blackberry 8800</u>
<u>IBM ThinkPad</u>

630

Have a Second Home?
<u>Start tracking your household inventory of your second home today.</u>

Unsorted Items   640

© 2007 PartScription  Privacy Policy  Security Policy  Return Policy  About Us  Contact Us  Press  Your Account  1-XXX-XXX-XXXX

SYSTEM AND METHOD FOR PROVISION OF MAINTENANCE INFORMATION AND PRODUCTS

RELATED APPLICATION(S)

This application claims the benefit of U.S. Provisional application No. 60/955,069 filed Aug. 10, 2007 which is incorporated herein in its entirety by reference.

TECHNICAL FIELD

This invention relates generally to information systems and more specifically to information systems relating to maintenance information and commerce, products, and services related to the maintenance information.

BACKGROUND

Homes and businesses are increasingly populated with equipment, gadgets, and products that require periodic maintenance to maintain the performance, usefulness, and longevity of the products. Given the variety of such products, such as telephones, mobile telephones, computers, cars, printers, kitchen appliances and so forth, it is increasingly difficult for homeowners and business operators to know what and how to track the maintenance information, tasks, and dates for such products. Moreover, homeowners and business operators must shop or research for maintenance related products and/or services from multiple sources in order to obtain replacement parts and/or obtain other related maintenance and repair information and services for the variety of products that may require periodic maintenance and servicing.

Other attempts to provide information relating to maintenance of products and replacement parts are generally limited to information relating to a single product or single service to the extent that such information is available at all. For example, an oil changing business will provide information such as periodic reminders to change the oil in one's car. The manufacturer of a particular device may provide occasional mailings or the like regarding warranty information for that device. Such attempts to provide maintenance and repair information to consumers fail to eliminate the need for a consumer to seek out maintenance information from multiple sources.

BRIEF DESCRIPTION OF THE DRAWINGS

The above needs are at least partially met through provision of the system and method for provision of maintenance information and products described in the following detailed description, particularly when studied in conjunction with the drawings, wherein:

FIG. 5 comprises a wire frame of an example website home screen for a client using a system as configured in accordance with various embodiments of the invention;

FIG. 8 comprises a wire frame of an example projects listing screen for a client using a system as configured in accordance with various embodiments of the invention;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE PREFERRED EMBODIMENTS

Generally speaking, pursuant to these various embodiments, a system and method are provided for the provision of maintenance related information and products to a consumer. By one approach, item information is received from a client regarding at least one of the plurality of disparate items. The method also includes receiving manufacturer information regarding the plurality of disparate items from information from manufacturers of the items. A selectively accessible database is created that includes at least in part the item information, the manufacturer information, and maintenance information derived at least in part from the manufacturer information relating to servicing at least one of the disparate items and/or to a product relating to at least one of the disparate items. The client is provided with access to the maintenance information stored on the selectively accessible database.

An example system for performing the method to store and provide maintenance related information includes a manufacturer information database storing manufacturer information relating to maintenance of a plurality of disparate items. The system includes a client database storing item information relating to disparate items of interest for at least one client. A controller is in communication with the manufacturer information database and the client database. The controller is programmed to allow maintenance of information stored on the manufacturer information database and the client database. The controller is also programmed to allow selective access to the manufacturer information for a client, for example, to access information related to the client's list of disparate items.

So configured, a client may have access to maintenance information relating to a plurality of disparate items without having to seek out multiple sources of products or information. For instance, a client using the system as described herein is able to access service information, repair information, product information, and/or accessory information regarding any number of products owned or possessed by the client from a single place. By another approach, periodic reminders regarding maintenance for products owned or possessed by the client can be provided to the client by the system.

Figure 1:
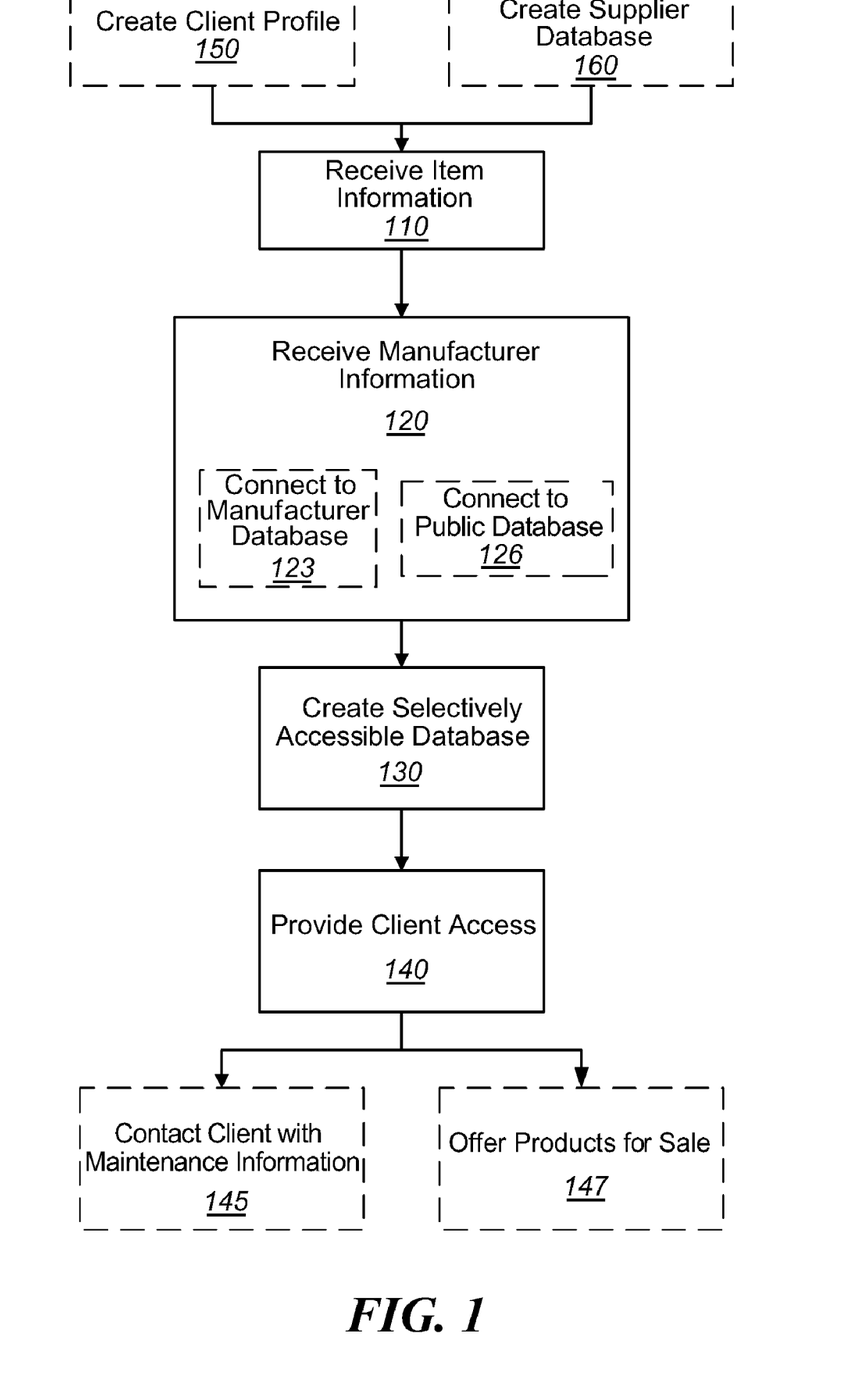
FIG. 1 comprises a flow diagram for a method of providing maintenance related information to a client as configured in accordance with various embodiments of the invention.

These and other benefits may become clearer upon making a thorough review and study of the following detailed description. Referring now to the drawings, and in particular to FIG. 1, an illustrative process that is compatible with many of these teachings will now be presented. In step 110, item information is received from a client regarding at least one of a plurality of disparate items. Information may be provided by the client during a transaction, such as during a purchasing transaction, for an item for which the client may wish to receive maintenance related information (either in conjunction with, or without, corresponding extended warranty coverage if desired). By another approach, a client may provide item information after purchasing the item through a network such as the Internet. By still another approach, a client may look up a part to determine part-specific information that can be used to determine maintenance information for the part.

Manufacturer information is received at step 120 regarding at least one of the plurality of disparate items from information from manufacturers of the item. By one approach, at step 123, the system connects to a manufacturer database to receive the manufacturer information. By yet another approach, the system connects to one or more public databases at step 126 to receive the manufacturer information. By either approach, information relating to the items as released or published by the manufacturer is collected for the client's later use or access. By one approach, this step 120 of acquiring this information can occur without the participation of, authorization of, or even the knowledge of the aforementioned client. Generally speaking, this step 120 can occur with as much, or as little, transparency as regards the client as may be appropriate to meet the needs of a given application setting.

At step 130, a selectively accessible database is created that includes at least in part the item information, the manufacturer information, and corresponding maintenance information. The maintenance information can be derived at least in part from the manufacturer information relating to at least one of servicing the disparate items and a product as may relate to at least one of the disparate items. It would also be possible to develop such maintenance information, at least in part, by leveraging one or more expert sources that are unrelated to the manufacturers themselves. This could include, for example, celebrity content comprising maintenance information sourced by well known and respected subject matter experts. A non-exhaustive list of items for which maintenance information can be stored includes telephones, mobile telephones, computers, kitchen appliances, a furnace, a vacuum, a washer, a dryer, a smoke detector, a lawn mower, a light bulb, a water softener, a computer, a printer, an audio accessory, a communication device, an automobile, an oven, a microwave, a refrigerator, an exercise machine, medication, and/or personal care items.

The maintenance information as may relate to the plurality of disparate items can include any information that may be helpful for the (preventative, reactive, and/or proactive) maintenance, repair, enhancement, or accessorization of such items. By one approach, products related to the disparate items can be made accessible to clients having access to the information on the database. For example, products relating to the disparate items may include a replacement product related to at least one of the disparate items, a product for repair of at least one of the disparate items, a part bundle related to at least one of the disparate items, an accessory related to at least one of the disparate items, or a cross item sold with or related to one of the plurality of disparate items. Replacement products, for example, may be products that can replace items stored or listed on the database. Products for repair are products that may be needed to repair items listed on the database.

In addition to products that may relate to the items, product bundles may be stored as part of the maintenance information as may relate to services or upkeep that may be related to a client's home or items. For example, products related to such needs may include project bundles for particular needs, such as a lawn mower spring tune up kit, a yard spring clean up kit, smoke detector spring and fall battery replacement kits, snow blower prep kits, cooking season check up products and information, communication device accessories, back to school products including laundry check up products, and heating season furnace check up products and services. The present teachings will also accommodate, if desired, bundling two or more such product bundles to form, for example, a seasonal bundle (such as, for example, a bundle that includes both a lawn mower spring tune up kit and a yard spring clean up kit).

Accordingly, the maintenance information as stored on the database may include at least one of the group including a suggestion for part replacement, a suggestion for accessories, information regarding item servicing, information regarding typical use of a part, a calendar of when to purchase parts for the items, a calendar of when to service the items, information regarding brick and mortar stores having maintenance related products, information regarding delivery of parts (including, for example, information regarding sources, typical delivery options, times, and costs, and so forth), information regarding automatic delivery of repetitive items (such as filters, vacuum cleaner bags, and other items that need periodic replacement), information regarding repair services, recall information for at least one of the disparate items, and information regarding add-ons for the disparate items.

At step 140, the client is provided access to the maintenance information stored on the selectively accessible database. The access may be provided via a network connected to the selectively accessible database. For example, a client may be able to access maintenance information on the database via the Internet. A client having access to the maintenance information on the selectively accessible database may be any person or organization granted access by the controller of the system. For example, the client may be a consumer who owns a house having a plurality of disparate items for which maintenance information may be kept. By another approach, a bricks-and-mortar store may have consideration-based access to the maintenance information stored on the selectively accessible database. In such an approach, the bricks-and-mortar store will be able to access information to help clients of the bricks-and-mortar store access information relating to products as may be sold by the bricks-and-mortar store. In yet another example, a client who has access to information on the selectively accessible database may access information relating specifically to items owned by the client when visiting a bricks-and-mortar store that may sell replacement parts for the items owned by the consumer.

In another example, a real estate professional may be granted consideration-based access to the maintenance information stored on the selectively accessible database. In this approach, a real estate professional hoping to help his or her client with respect to household products as may be sold or transferred with real estate may want to have access to information such as replacement parts and recommended scheduling, servicing options, recall notices or similar indications, and the like to help clients maintain the real estate. Real estate professionals and bricks-and-mortar stores may be required to provide consideration such as subscription fees or per-use fees to the owner or operator of the database in exchange for access to the information. Or, in the alternative, some other intervening party may wish to provide consideration for access to such information which they then provide to their clients using some other business model.

The method at step 145 may further include proactively contacting the client to provide the client with maintenance information that may be stored on the database. Contacting the client may include sending a message including periodic home maintenance information to the client, including information relating to purchasing products available to meet maintenance needs for the client, and/or providing scheduled maintenance reminders for the client. Messages may be automatically sent and/or preformed according to a schedule. For example, the client may be contacted with maintenance information seasonally or in accordance with a schedule for replacing parts as may relate to the plurality of disparate items listed for the client. By another approach, the client may be contacted semi-annually, monthly, or according to any other schedule that may be chosen by an operator of the system, by the client, or by another method. The client may be provided access to the maintenance information via a number of methods, for example, through a telephone call, an Internet connection, a visit to a hardware store, and by mail. The system may be configured to automatically provide information under any of these methods, for example, via an electronic mail message, automatically printing and sending mail, by placing an automatic telephone call, and so forth. The client may also be provided access to the information via a bricks-and-mortar store, for example, by providing information to the bricks-and-mortar store such that the bricks-and-mortar store has the information available to the customer upon the customer's next visit to the store. (As used herein, it will be understood that such information can be provided to a given "client" by providing it directly to the client or by providing the information to some authorized representative of the client, such as an employee or third party contractor who is charged with corresponding maintenance responsibilities.)

At step 147, products relating at least in part to the maintenance information may be offered for sale to the client via (or using) information on the database. For example, when a client accesses maintenance information on the database, the client may be offered the ability to purchase products, information, and/or services related to the maintenance, repair, or replacement of the plurality of disparate items listed for the client directly, without the need to contact another store or service provider. Such products may include exact replacement parts, approved replacement parts from a different manufacturer, or unapproved replacement parts.

At the beginning of the process, a client profile may be created and stored for the client at step 150. The client profile typically includes contact information, a list of items owned or possessed by the client, and the maintenance information for the disparate items. For example, at the creation of the client profile or when updating the profile, the client may enter into the profile a list of disparate items for which the client wishes to have access to maintenance information through the system or for which the client wishes to receive messages including maintenance information. The client can also enter purchase or repair dates to help the system to schedule future maintenance as part of the maintenance information. The client contact information includes the information necessary to contact the client regarding the maintenance information, for example, an email address, a phone number, and a maintenance delivery address for shipment of products. Upon receipt of the information regarding the disparate items, the client profile is updated by the system to include additional information regarding the disparate items. For example, occasional maintenance requirements for the disparate items may be included in the client profile. Other examples include an inspection or repair schedule for at least one of the disparate items or for a replacement part for one of the disparate items. A client profile may also include a replacement schedule for any of the disparate items or for replacement parts for the items. The client profile may also include replacement parts compatible with the disparate items.

The client profile may be created in combination with the completion of the transaction with the client. For example, a client may purchase an item online, and as part of the check out procedure for completing the purchase, the client may be given the option of creating a profile with the system through which the client may access maintenance information. Similarly, the client profile may be updated in combination with completing a transaction. In such an approach the client may already have a profile to update with information regarding the newly purchased item.

At step 160, a database of suppliers of maintenance products and services available to the client is created and maintained. The database of suppliers of maintenance products and maintenance services can be selectively accessed by a client in connection with the maintenance information such that the client may be able to purchase products or secure various services as may be required for maintenance of the items listed on the client's profile. This step 160 can be taken on an occasionally-scheduled basis, if desired, and without synchronicity to the other described steps. Or, in the alternative, this step 160 can be undertaken on the fly and in conjunction with carrying out one or more of the described steps.

Figure 2:
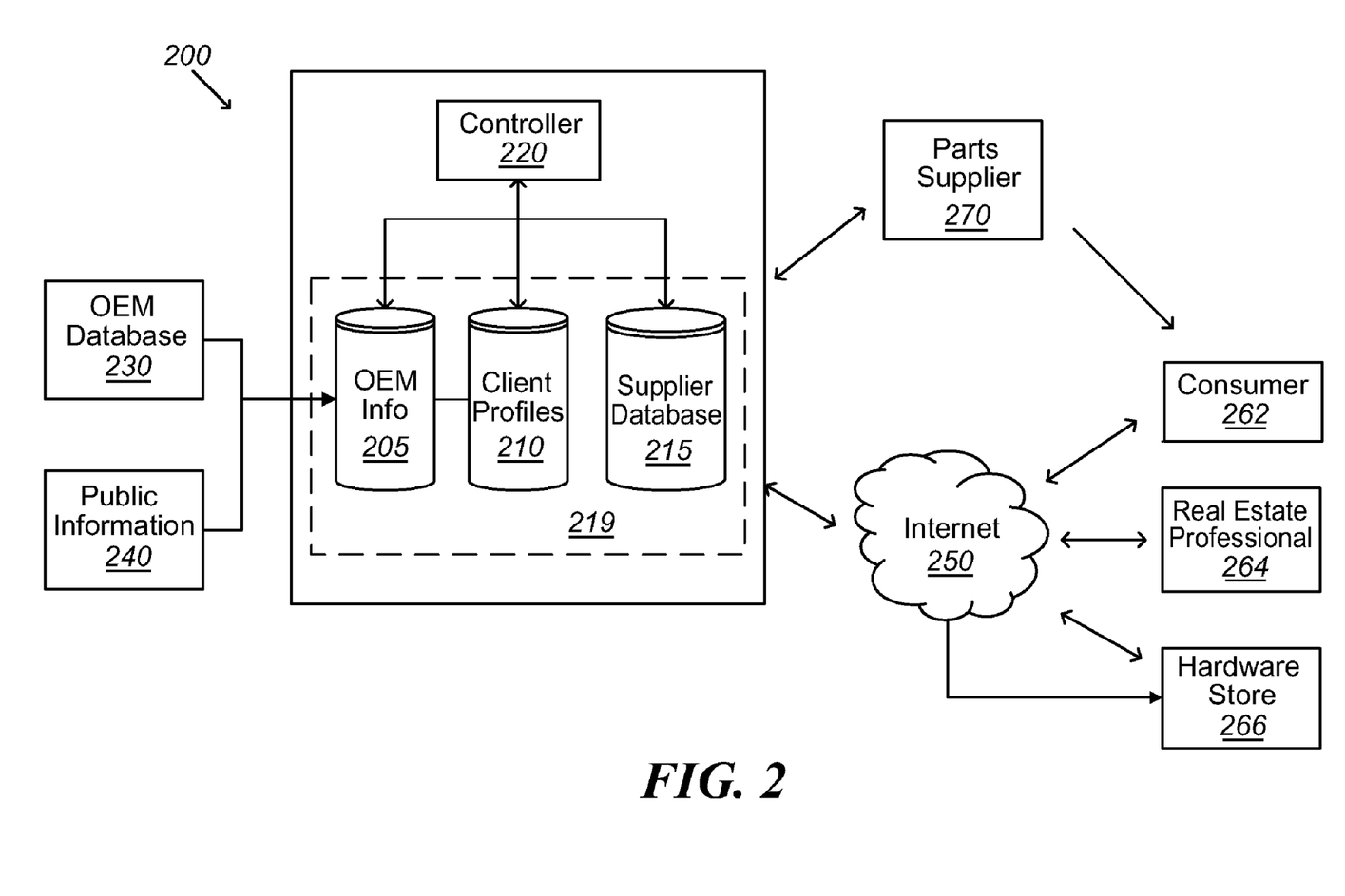
FIG. 2 comprises a block diagram of a system configured to provide maintenance related information as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided. A system 200 for storing and providing maintenance related information includes a manufacturer information database 205 that stores manufacturer information relating to maintenance of a plurality of disparate items. The system 200 also includes a client database 210 that stores item information and maintenance information, such as scheduling information, relating to disparate items of interest for at least one client. A supplier database 215 is optionally included to store information relating to suppliers of products and services as may relate to maintenance of the disparate items for a client. The manufacturer database 205, client database 210, and supplier database 215 may be separate databases or combined into a single, selectively accessible database 219. Other storage and access configurations are possible. (Those skilled in the art will recognize that databases as such are well known in the art. As these teachings are not overly sensitive to the selection of any particular approach in these regards, further elaboration will not be presented here for the sake of brevity except where additional description may be deemed helpful to the reader.)

A controller 220 is in communication with the manufacturer information database 205 and the client database 210. The controller 220 is programmed to allow maintenance of information stored on the manufacturer information database 205 and the client database 210. The controller 220 is programmed to allow selective access to the manufacturer information database 205 for a client. The manufacturer information database 205 is configured to be in communication with a manufacturer database 230 to access information regarding items from the manufacturer. For example, the manufacturer database 230 may be maintained by an original equipment manufacturer (OEM) such that the manufacturer information database 205 may directly download information relating to items as may be produced by an original manufacturer (OEM). By another approach, the manufacturer information database 205 is in communication with a public database 240 to access information regarding at least one of the plurality of disparate items. By this approach, publicly available information as may relate to maintenance of products or items owned and used by clients of the system 200 can be downloaded to the manufacturer information database 205 for access by the client.

Those skilled in the art will recognize and appreciate that such a controller 220 can comprise a fixed-purpose hardwired platform or can comprise a partially or wholly programmable platform (such as a microprocessor, a microcontroller, or any number of other digital computational platforms that are known in the art). All of these architectural options are well known and understood in the art and require no further description here.

The system 200 may be configured to connect to a network such as the Internet 250 or other communication network through which the selective access to the manufacturer information database 205 is provided. For instance, a consumer at block 262, a real estate professional at block 264, and a hardware store at block 266 each may be able to access the information as stored on the selectively accessible database 219 through the Internet 250. Each such client's access, however, can be typically limited according to the account held by each client.

In operation, the controller 220 controls access to and provision of information from the selectively accessible database 219. Accordingly, the controller 220 may be configured and programmed to send messages to a client including information relating to the plurality of disparate items. By one approach, the controller 220 is configured to send electronic messages via the Internet 250 to a consumer 262 on a periodic basis including information such as maintenance information relating to the disparate items owned or possessed by the consumer 262. By another approach, a consumer 262 may access information stored on the database 219 and decide that one or more products may need to be purchased to maintain one of the plurality of disparate items owned or controlled by the consumer 262.

In one such approach, the consumer 262 may place an order through the system 200 via the Internet 250 such that the controller 220 automatically contacts a parts supplier 270. In such an approach, the parts supplier 270 may ship the parts as ordered by the consumer 262 directly to the consumer 262 without having to deal with any additional middlemen in the supply process. By another approach, the parts supplier 270 may ship the parts to the hardware store 266 for pickup by or delivery to the consumer 262. As yet another example in this regard, the part could be shipped to a previously identified third party, such as a third party contractor, who then arranged to install the part for the consumer 262.

Those skilled in the art will recognize and understand that such a system 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 3:
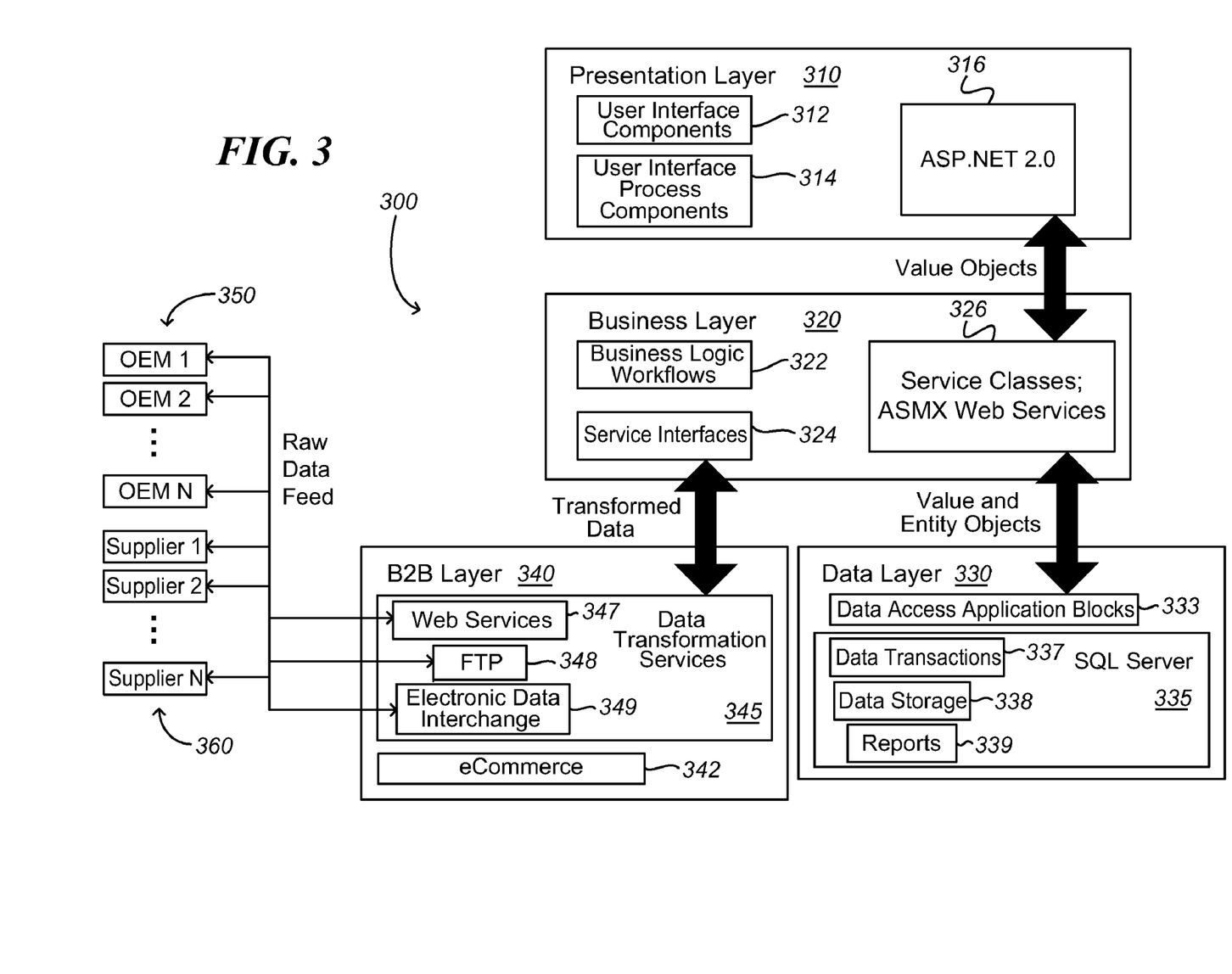
FIG. 3 comprises a block diagram of an example architecture for a system configured in accordance with various embodiments of the invention.

An exemplary application architecture 300 for implementing the system 200 will be described with reference to FIG. 3. In this example, the architecture 300 includes several operation and data layers that operate on a web and database server (for example a Dell PE2950 2U with dual XEON 5310 processors, a MICROSOFT WINDOWS server 2k3 standard 64 bit, a MICROSOFT SQL server 2k5 Enterprise 64 bit, and a database) or dual web servers with a separate database server. A presentation layer 310 operates to provide an interface for the system to users. The interface is typically web-based using user interface ("UI") components 312 and UI process components 314. The UI components 312 and UI process components 314 may be implemented via various software applications such as AJAX.NET from MICROSOFT, JavaScript based software, C# based software for the .NET virtual machine environment, and/or software products from zNode LLC. In this example, an ASP.NET 2.0 web application framework 316 is used to build the site and communicate with other architecture layers to provide content for the system.

A business layer 320 includes business logic workflows 322 and service interfaces 324. The business logic workflows 322 and service interfaces 324 can be implemented using C# based software. The web services or software system designed to support machine-to-machine interaction in this system is an ASMX Web Services or service classes framework 326. The service classes framework 326 exchanges value objects with the ASP.NET 2.0 web application framework 316 of the presentation layer 310.

A data layer 330 handles data issues for the system. The data layer 330 includes data access application blocks 333 that exchange value and entity objects with the service classes framework 326 of the business layer 320. A Structured Query Language ("SQL") server 335 handles data transactions 337, data storage 338, and reports 339 (for example via SQL reporting services).

A business-to-business ("B2B") layer 340 handles exchanges of information between the system architecture and outside business entities. One portion of this layer includes an eCommerce framework 342 (software available, for example, from zNode LLC) to handle the transfer of information necessary to sell goods and ship goods to consumers that are purchased via the network. A data transformation services set 345 of software objects and utilities allow the automation of extract, transform, and load operations to or from the system's database. This data transformation services set 345 exchanges transformed data with the service interfaces 324 framework of the business layer 320. The data transformation services set 345 handles web services utilities 347, file transfer protocol ("FTP") 348 communications, and electronic data interchange 349 methods of exchanging information with outside entities. These outside entities include manufacturers 350 of products sold or stored as client items such that OEM information about the parts or items is available in the system. Other outside entities that exchange information via the B2B layer 340 include part suppliers 360 that supply parts sold through the system.

Figure 4:
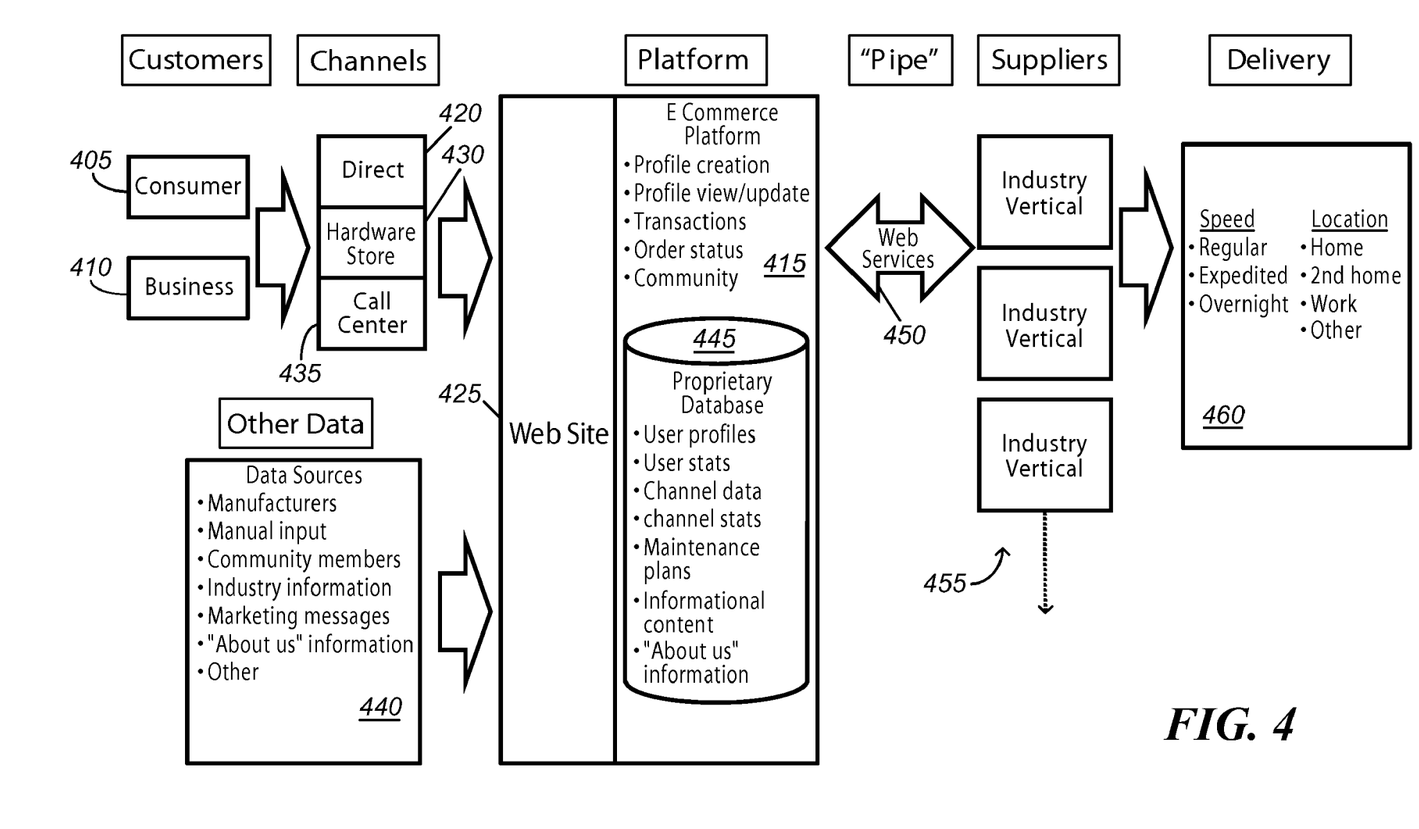
FIG. 4 comprises an information flow diagram of an example operation of a system and method in accordance with various embodiments of the invention.

A process flow chart describing one example of the system operation will be described with reference to FIG. 4. Customers of the system and method described herein such as consumers 405 and business 410 provide information such as client profile information through various channels to the system platform 415. The information may be provided directly 420 by the customers to the platform 415 via the system's website 425. Information is also provided via visits to hardware stores 430 that have partnered with the operator of the platform 415 to provide additional services and information to the hardware store customers. By another approach, information is provided via a call center 435.

Additional data is provided to the platform 415 in a number of ways shown in block 440. Information about products is provided by manufacturers of those products. Employees of the platform operator may manually input helpful information. Community members may submit information regarding local stores and service providers. Members of a particular industry may submit industry specific information, such as part supplier information or product repair and maintenance information. Marketing messages and company specific information may be submitted to the platform 415 as well.

The platform 415 of this example has an E-Commerce Platform for profile creation, viewing, and updating; for handling transactions; for checking order status; and for managing the community of users or clients. The platform 415 includes a database that stores the various items of information used by the platform 415. The platform 415 communicates via web services 450 with various industry product and service providers 455 in response to requests for or purchasing of services or products by the platform's customers. At block 460, the industry product and service providers 455 then deliver the services or products as requested by the customers.

With reference to FIGS. 5 through 9, example interfaces for a client to the maintenance information and client profiles will be described. Such interfaces with the system can be readily selected by those skilled in the art, and such description is omitted here for clarity.

One example way to access the maintenance information for a client is through a web site via the Internet. FIG. 5 depicts one example home page 500 for a client who logs on to an account for maintenance information in accordance with the methods and systems described herein. The home page 500 includes links to various pages of the website including those designed to help a client find a part 505, review the client's home inventory 510 of items, provide help for projects 515, and the like. Alerts are included in the home page 500, for example, to provide account information or to provide certain types of maintenance information. In this example, an alert 520 is provided to notify the client of a recall that relates to one of the client's items stored in the client's profile. A maintenance block 530 is included to show upcoming maintenance needed for items in the client's profile. A recent orders block 540 is included to show recent orders. A favorite projects block 550 lists links to projects that are common for the client's items. A block 560 allows the client to search for particular parts. A home inventory block 570 provides groupings of items in the client's profile. Additional links 580 to information can be provided such as for maintenance tips or sales for particular products.

Figure 6:
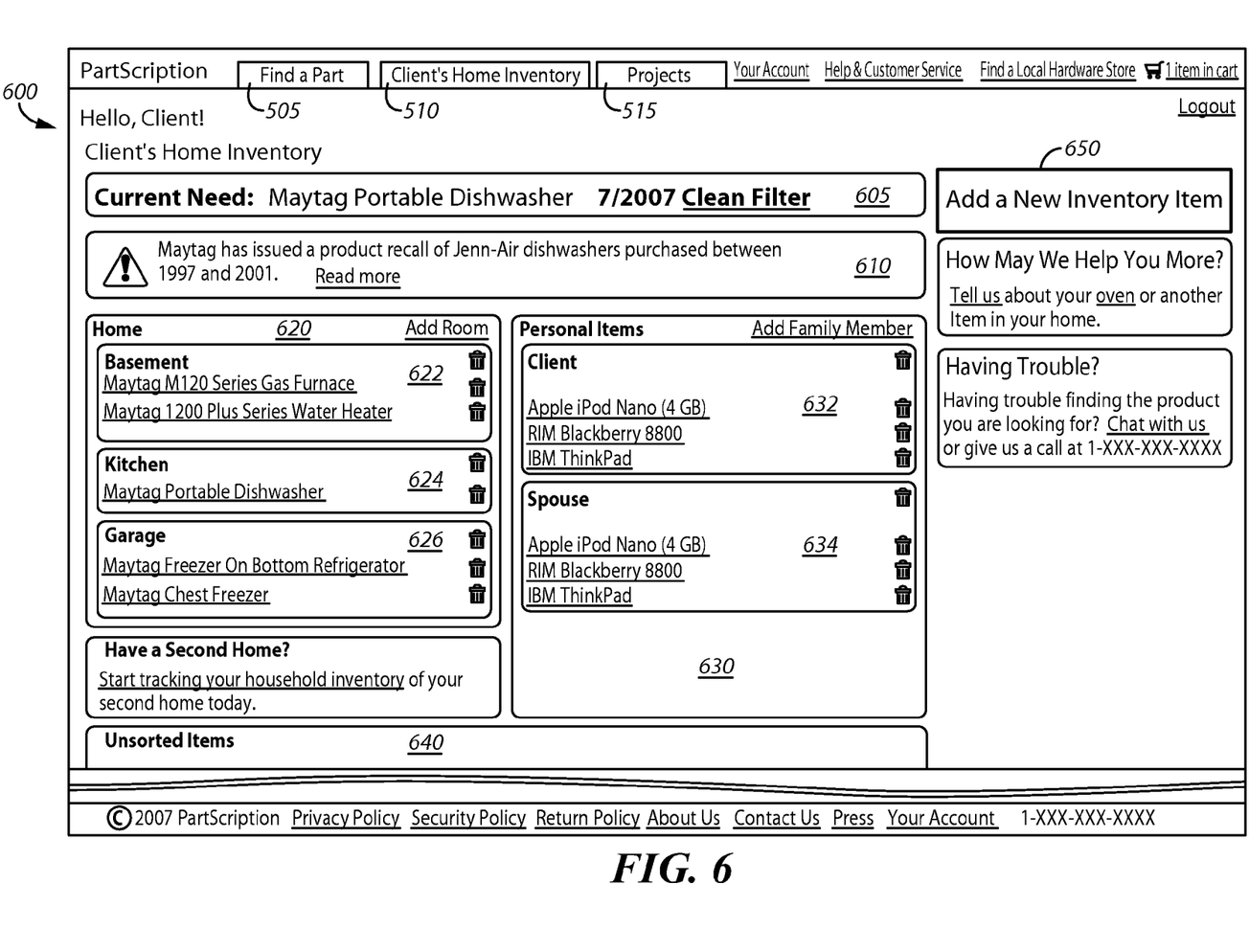
FIG. 6 comprises a wire frame of an example home inventory screen for a client using a system as configured in accordance with various embodiments of the invention.

FIG. 6 shows one example of a home inventory page 600 for the client. Alerts can be included on the home inventory page 600 to alert the client of a current need 605 based on the maintenance information related to the client's items. Alerts regarding recall information 610 may also be included on this page. The client's inventory of items is sorted into groups. A home block 620 having a breakdown according to rooms, with a basement group 622, a kitchen group 624, and a garage group 626. A personal items group 630 includes a breakdown of items belonging to particular people in blocks 632 and 634. Selecting the links to any of the items will provide the client with information regarding that particular item such as a repair schedule, replacement products for that item, service providers for that item, and the like. Unsorted items may be listed in an unsorted items block 640. The home inventory page 600 also includes a link 650 for adding new items to the client's profile. Additional links providing additional information or services may be provided on the home inventory page 600.

Figure 7:
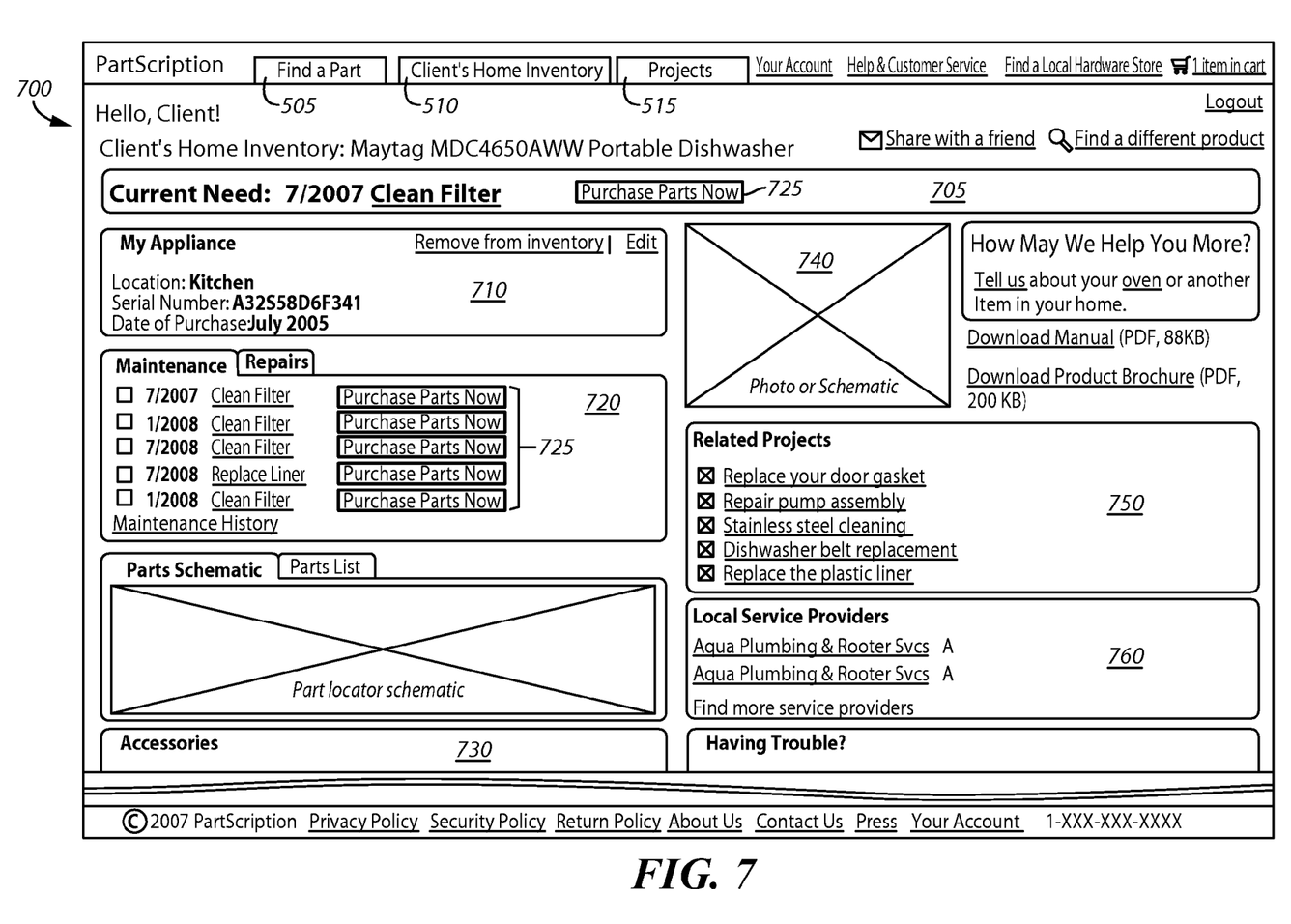
FIG. 7 comprises a wire frame of an example item screen for a client using a system as configured in accordance with various embodiments of the invention.

Should a client select a particular item to review, FIG. 7 shows one example item information page 700 providing such item information to the client. As on the other pages, an alert 705 related to the item is provided on the item information page 700. Identification information is provided in block 710 to specifically identify the item including the item's serial number and purchase date. A maintenance/repair block 720 provides information for upcoming maintenance for the item and/or past/anticipated repairs for the item. Purchase now links 725 are provided to allow the client to purchase the products or services needed for each maintenance event. A purchase now link 725 is also included with the alert 705 to allow easy access to the necessary parts for the client.

Additional information about the item is provided in block 730 including a parts list and schematic to assist with maintenance of the item. A list of accessories related to the item is provided at block 730. A picture of the item may be provided at block 740. Projects that relate to the item, such as replacing parts of the item, repairing the item, and cleaning projects for the item, are listed in a related projects block 750 such that the client may select one of the projects to receive information about performing that task. A list of local service providers that can provide services related to the item are listed in the local service providers block 760 such that the client need only select one from the list should servicing be necessary. Additional links can provide additional information such as access to the item's manual or product brochure.

An example of a client's projects page 800 is shown in FIG. 8. Projects that relate to items in the client's profile may be grouped in a variety of ways. In block 810, projects relating to the items are listed in an order determined by the items that drive the highest number of sales. By another approach, the projects may be listed according to the scheduled completion for the task. Icons 815 can be provided that rate the project according to users rating or other ratings. In block 820, projects are listed that have been shared by the client. Featured project blocks 830 provide information regarding projects that are popular or likely helpful for a client. An all-projects block 840 lists all projects relevant to the client's profile. As with the other pages, additional links can be added to the page.

Figure 9:
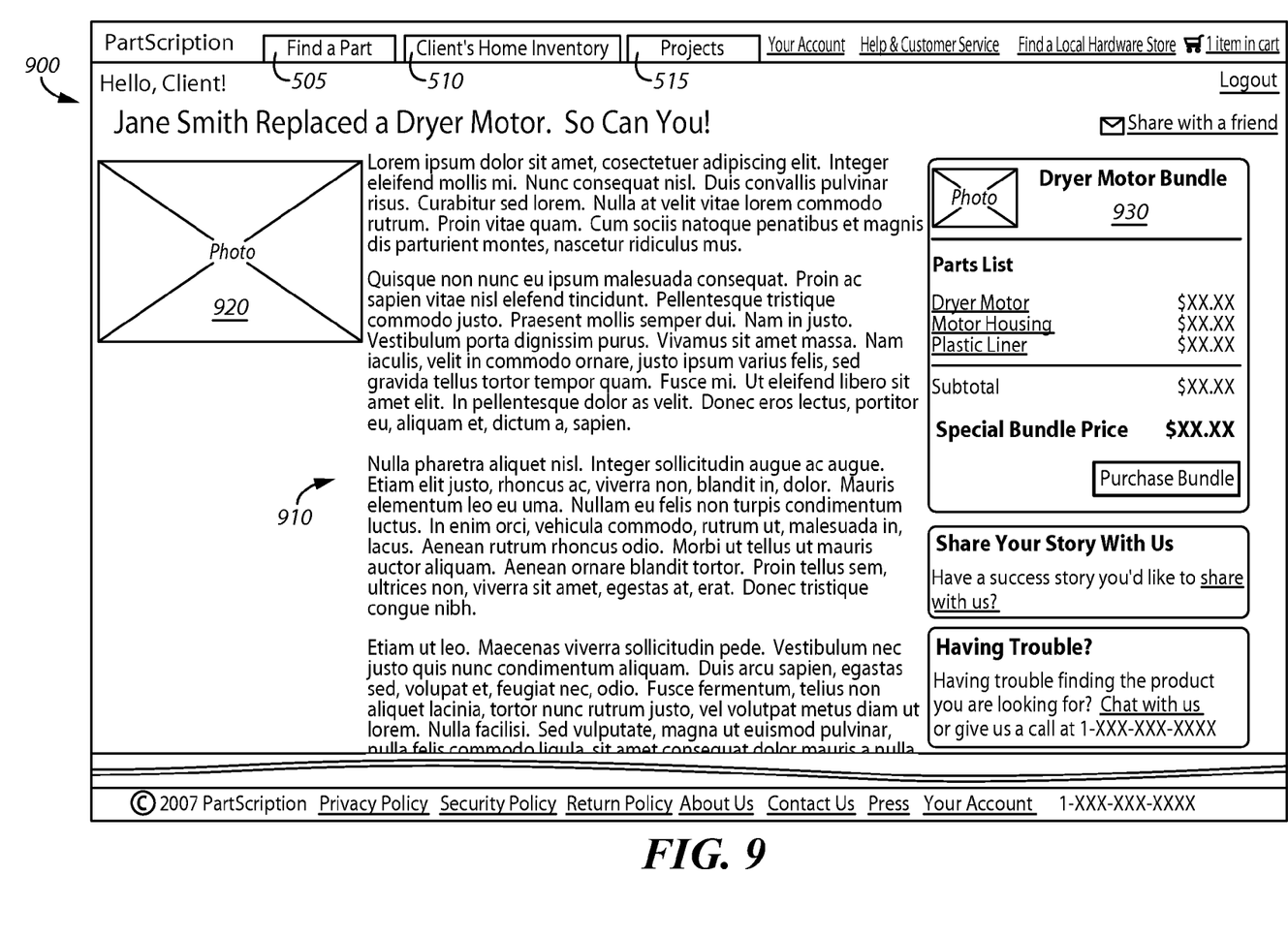
FIG. 9 comprises a wire frame of an example project screen for a client using a system as configured in accordance with various embodiments of the invention.

Should a client select a project to review, the client can be provided with a project page 900 such as the example shown in FIG. 9 with information on how to perform the project. The information includes a description 910 of how to perform the task and a picture 920 of the target part. A bundle of products that are useful for the project are provided in block 930 to allow the client to easily purchase the products needed to complete the project. Additional links can allow the client to share experiences regarding the project with other clients or allow the client to view other client's experiences.

So configured, a client has access to a variety of maintenance related information, products, and services regarding a variety of types of items through a single source. By entering item information into the system, the client can access a variety of information that will allow the client to maintain products in the client's home or business very efficiently with all of the relevant information collected in one place. The system also allows for businesses to access customers efficiently to market replacement and repair related items that customers may not otherwise seek out. Other businesses such as real estate professionals and traditional hardware stores will also seek out such a system to allow ease of access to information for clients.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one illustrative example in this regard, these teachings would readily accommodate implementing some or all of the described steps, actions, and functionality in conjunction with insurance coverage requirements. By this approach, an insurance company could offer a branded portal that serves as a point of access to such a service, and use of this service could be required, if desired, to maintain insurance on certain kinds of items.

What is claimed is:

1. A method comprising:
   receiving item information from a consumer or a bricks-and-mortar store regarding at least one of a plurality of disparate items;
   receiving manufacturer information regarding the at least one of the plurality of disparate items from information from manufacturers of the items;
   a controller device creating a selectively accessible database comprising at least in part the item information, the manufacturer information, and maintenance information derived at least in part from the manufacturer information relating to at least one of a group comprising servicing at least one of the disparate items and a product relating to at least one of the disparate items;
   receiving an inquiry from the consumer via the bricks-and-mortar store for access to the maintenance information stored on the selectively accessible database;
   in response to the inquiry, the controller device sending a signal to effect delivery directly to the consumer of a product or service from a supplier separate from the bricks-and-mortar store.

2. The method of claim 1 wherein the step of receiving item information from the client regarding at least one of the plurality of disparate items further comprises receiving information provided from the client during a transaction.

3. The method of claim 1 wherein the step of receiving item information from the client regarding at least one of the plurality of disparate items further comprises receiving information provided from the client during a transaction at a brick-and-mortar store.

4. The method of claim 1 wherein the step of receiving manufacturer information regarding the at least one of the plurality of disparate items from information from manufacturers of the items further comprises connecting to at least one of a manufacturer database and a public database.

5. The method of claim 1 wherein the maintenance information comprises at least one of a group comprising:
   a suggestion for part replacement;
   a suggestion for accessories;
   information regarding item servicing;
   information regarding typical use;
   a calendar of when to purchase parts for the at least one disparate item;
   a calendar of when to service the at least one disparate item;
   information regarding brick-and-mortar stores having maintenance-related products;
   information regarding delivery of parts;
   information regarding automatic delivery of repetitive items;
   information regarding repair services;
   recall information for at least one of the disparate items;
   information regarding add-ons for the disparate items.

6. The method of claim 1 further comprising creating and storing a consumer profile for the consumer including consumer contact information and the maintenance information for the disparate items wherein the consumer profile further comprises at least one step selected from the group consisting of:
   occasional maintenance requirements for the disparate items;
   a repair schedule for at least one of a group comprising at least one of the disparate items and a replaceable part for at least one of the disparate items;
   a replacement schedule for at least one of a group comprising the disparate items and a replaceable part for at least one of the disparate items;
   replacement parts compatible with the disparate items.

7. The method of claim 1 wherein the step of receiving an inquiry from the consumer via the bricks-and-mortar store for access to the maintenance information stored on the selectively accessible database further comprises receiving the inquiry from the consumer via the bricks-and-mortar store for access to the maintenance information stored on the selectively accessible database via a network connected to the selectively accessible database.

8. The method of claim 1 further comprising contacting the consumer to provide the consumer with maintenance information.

9. The method of claim 8 wherein contacting the consumer to provide the consumer with maintenance information further comprises sending a message including periodic home maintenance information to the consumer including information relating to at least one of purchasing products available to meet maintenance needs for the consumer and providing scheduled maintenance reminders for the consumer.

10. The method of claim 8 wherein the step of contacting the consumer to provide the consumer with maintenance information is automatically performed according to a schedule.

11. The method of claim 1 further comprising creating and maintaining a database of suppliers of at least one of maintenance products and maintenance services available to the consumer for periodic maintenance.

12. The method of claim 11 further comprising providing the consumer with selective access to the database of suppliers of maintenance products and maintenance services.

13. The method of claim 1 further comprising providing to a brick-and-mortar store consideration-based access to the maintenance information stored on the selectively accessible database.

14. The method of claim 1 further comprising providing to a real estate professional consideration-based access to the maintenance information stored on the selectively accessible database.

15. The method of claim 1 further comprising offering for sale the product relating at least in part to the maintenance information.

16. A system for storing and providing maintenance related information, the system comprising:
- a manufacturer information database storing manufacturer information relating to maintenance of a plurality of disparate items;
- a client database storing item information relating to disparate items of interest for at least one consumer;
- a controller in communication with the manufacturer information database and the client database, the controller programmed:
  - to allow maintenance of information stored on the manufacturer information database and the client database,
  - to allow selective access to the manufacturer information database for the at least one consumer via a bricks-and-mortar store, and
  - to send, in response to receiving a purchase signal from the consumer via the brick-and-mortar store, a signal to effect delivery directly to the consumer of a product or service from a supplier separate from the bricks-and-mortar store.

17. The system of claim 16 wherein the manufacturer information database is in communication with a manufacturer database to access information regarding items from the manufacturer.

18. The system of claim 16 wherein the manufacturer information database is in communication with a public database to access information regarding at least one of the plurality of disparate items.

19. The system of claim 16 wherein the system is configured to connect to a network through which the selective access to the manufacturer information database is provided.

20. The system of claim 16 wherein the controller is programmed to send messages to the client including information relating to the plurality of disparate items.

21. A non-transitory computer readable medium configured to store programming configured to effect operations comprising:
- receiving item information from a consumer or a bricks-and-mortar store regarding at least one of a plurality of disparate items;
- receiving manufacturer information regarding the at least one of the plurality of disparate items from information from manufacturers of the items;
- a controller device creating a selectively accessible database comprising at least in part the item information, the manufacturer information, and maintenance information derived at least in part from the manufacturer information relating to at least one of a group comprising servicing at least one of the disparate items and a product relating to at least one of the disparate items;
- receiving an inquiry from the consumer via the bricks-and-mortar store for access to the maintenance information stored on the selectively accessible database;
- in response to the inquiry, the controller device sending a signal to effect delivery of a product or service from a supplier separate from the bricks-and-mortar store directly to the consumer.

* * * * *